United States Patent
Wu et al.

[11] Patent Number: 5,958,823
[45] Date of Patent: Sep. 28, 1999

[54] HYDROCARBON CONVERSION CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/237,277

[22] Filed: Jan. 26, 1999

[51] Int. Cl.$^6$ ............................... B01J 21/02; B01J 21/04
[52] U.S. Cl. .................. 502/207; 502/202; 502/325; 502/332; 502/334; 502/339
[58] Field of Search .................... 502/202, 207, 502/325, 332, 334, 339

[56] References Cited

U.S. PATENT DOCUMENTS

| | | | |
|---|---|---|---|
| 2,999,074 | 9/1961 | Bioch et al. | 252/442 |
| 4,912,072 | 3/1990 | Mallouk et al. | 502/74 |
| 5,488,024 | 1/1996 | Cheung et al. | 502/325 |
| 5,707,921 | 1/1998 | Wu et al. | 502/334 |

Primary Examiner—Elizabeth D Wood
Attorney, Agent, or Firm—Lucas K. Shay

[57] ABSTRACT

A catalyst composition and a process for producing the catalyst composition for use in a hydrocarbon conversion process are disclosed. The composition comprises an inorganic support and a Group VIII metal. The process comprises: (1) combining at least one Group VIII metal compound and an inorganic support to form a mixture, (2) calcining the mixture under a condition sufficient to convert the metal compound to its oxide form to produce a heated mixture, (3) contacting the heated mixture with a boron compound under a condition sufficient to reduce the oxidation state of the metal whereby a boron-treated composition is produced; and (4) contacting the boron-treated composition with a compound comprising aluminum and halogen.

19 Claims, No Drawings

5,958,823

HYDROCARBON CONVERSION CATALYST COMPOSITION AND PROCESSES THEREFOR AND THEREWITH

FIELD OF THE INVENTION

This invention relates to a catalyst composition useful for converting a linear hydrocarbon to a branched hydrocarbon, a process for producing the composition, and a process for using the composition in a hydrocarbon conversion process.

BACKGROUND OF THE INVENTION

It is well known to those skilled in the art that hydrocarbons are a class of very important industrial chemicals which find a variety of uses in the industry such as, for example, in production of various organic compounds. It is well known to isomerize a linear hydrocarbon to a branched-chained hydrocarbon using a Group VIII metal-containing catalyst. See, for example, U.S. Pat. No. 5,004,859.

However, in the known processes, the conversion of a linear hydrocarbon to a branched-chained hydrocarbon and the selectivity thereto are generally not as high as one skilled in the art would desire. Accordingly, there is an ever-increasing need to develop a process for producing a catalyst for converting a linear hydrocarbon to the more valuable branched hydrocarbon. The conversion of a linear hydrocarbon to a branched hydrocarbon is hereinafter referred to as hydrocarbon conversion process. Such development would also be a significant contribution to the art and to the economy.

SUMMARY OF THE INVENTION

An object of this invention is to provide a catalyst composition which can be used in a hydrocarbon conversion process. Also an object of this invention is to provide a process for producing the catalyst composition. Another object of this invention is to provide a process which can employ the catalyst composition in a hydrocarbon conversion process. An advantage of the process for producing the catalyst composition is that, when compared with a commercially available catalyst, the process produces a catalyst having a very low halogen content and the catalyst thus produced exhibits high hydrocarbon conversion activity as well as satisfactory yield of and good selectivity to branched hydrocarbons. Other objects and advantages will become more apparent as this invention is more fully disclosed hereinbelow.

According to a first embodiment of the present invention, a composition which can be used as catalyst for converting a linear hydrocarbon to a branched hydrocarbon is provided. The composition comprises at least one metal selected from Group VIII metals and an inorganic support. The term "Group VIII" refer to the CAS version of the Periodic Table of the Elements, CRC Handbook of Chemistry and Physics, 67th edition, 1986–1987, CRC Press, Boca Raton, Fla.

According to a second embodiment of the invention, a process for producing a composition which can be used as catalyst in a hydrocarbon conversion process is provided. The process can comprise, consist essentially of, or consist of: (1) combining at least one Group VIII metal compound and an inorganic support to form a mixture, (2) calcining the mixture under a condition sufficient to convert the metal compound to its oxide form to produce a heated mixture, (3) contacting the heated mixture with a boron compound under a condition sufficient to reduce the oxidation state of the metal whereby a boron-treated composition is produced; and (4) contacting the boron-treated composition with a compound comprising aluminum and halogen.

According to a third embodiment of the present invention, a process which can be used for converting a linear hydrocarbon or mixture of linear hydrocarbons to a branched hydrocarbon or a mixture of branched hydrocarbons is provided which comprises, consists essentially of, or consists of, contacting a fluid which comprises a linear hydrocarbon or mixture of linear hydrocarbons, optionally in the presence of an inert fluid, with a catalyst composition which can be the same as disclosed above in the first embodiment of the invention under a condition effective to convert a linear hydrocarbon to a branched hydrocarbon.

DETAILED DESCRIPTION OF THE INVENTION

According to the first embodiment of the invention, a composition which can be used as catalyst in a hydrocarbon conversion process is provided. As used herein, the term "hydrocarbon" generally refers to, unless otherwise indicated, one or more hydrocarbons, saturated or unsaturated, having 1 to about 30 carbon atoms, preferably 2 to about 20 carbon atoms, more preferably 2 to about 16, and most preferably 2 to 10 carbon atoms per molecule. Also preferably, the hydrocarbon is an aliphatic saturated hydrocarbon, a mixture of saturated aliphatic hydrocarbons, or a mixture of saturated aliphatic hydrocarbons and unsaturated hydrocarbons. Examples of hydrocarbons include, but are not limited to, ethane, propanes, butanes, pentanes, heptanes, octanes, nonanes, dodecanes, gasoline, or combinations of two or more thereof. The composition can comprise, consist essentially of, or consist of, an inorganic support having incorporated therein, or impregnated thereon, a selectivity-improving or a conversion-enhancing amount of a Group VIII metal to improve the hydrocarbon conversion process. The term "improving" or "improve" or "enhancing" refers to, unless otherwise indicated, an increased percent of conversion of linear hydrocarbon, or an increase percent selectivity, to branched hydrocarbon in the product stream of a hydrocarbon conversion process using a catalyst produced by the process of the invention, as compared to using a catalyst which is not produced by the process of the invention. The term "branched hydrocarbon" and "branch-chained hydrocarbon" are interchangeable.

The term "metal" used herein refers to, unless otherwise indicated, both "metal" and "element" of the Periodic Table of the Elements because some elements in the Periodic Table of the Elements may not be considered as metals by those skilled in the art.

According to the first embodiment of the invention, the weight percent (%) of the Group VIII metal or element in the composition of the invention can be any weight % so long as the weight % can improve the yield of or selectivity to a branched hydrocarbon in a hydrocarbon conversion process. Generally, the weight % of Group VIII metal can be in the range of from about 0.0001 to about 5%, preferably about 0.005 to about 3%, more preferably about 0.05 to about 2%, and most preferably from 0.1 to 1.5% for an effective hydrocarbon conversion.

The oxidation state of the metal is preferably 0. If a combination of metals is employed, the molar ratio of the second metal, or the third metal, or the fourth metal to the first metal can be in the range of about 0.01:1 to about 100:1.

Any commercially available inorganic support known to one skilled in the art can be employed in the present invention. Examples of suitable inorganic supports include, but are not limited to, aluminosilicates (zeolites), silicoaluminophosphates (SAPO), inorganic oxides, spinels, or combinations of two or more thereof. Examples of suitable SAPO's include, but are not limited to, SAPO-5, SAPO-11, SAPO-31, SAPO-37, and combinations of two or more thereof. The inorganic oxide can be a clay, an alumina, a silica, or combinations of two or more thereof. If a spinel support is used, the metal of the spinel is selected from the group consisting of zinc, magnesium, iron, manganese, calcium, zirconium, molybdenum, ruthenium, rhenium, cobalt, germanium, and combinations of two or more thereof. The presently preferred inorganic oxide is an alumina. The inorganic support, when present, generally makes up the rest of the composition.

In the second embodiment of the invention, an inorganic support can be combined with a Group VIII compound, preferably in a solution or suspension, under a condition well known to those skilled in the art to incorporate a compound into an inorganic support whereby a mixture is produced. Because the methods for incorporating or impregnating a compound into an inorganic support such as, for example, impregnation by incipient wetness method, are well known to those skilled in the art, the description of which is omitted herein for the interest of brevity.

Generally, in the first step of the process of the second embodiment of the invention, at least one inorganic support can be combined with at least one Group VIII compound in any suitable weight ratio which would result in the weight % of a Group VIII metal disclosed in the first embodiment of the invention. Presently it is preferred that such combination be carried out in a suitable liquid, preferably an aqueous medium, to form an incipient wetness inorganic support-metal compound mixture. The combining of an inorganic support and a Group VIII compound can be carried out at any temperature. Generally, the temperature can be in the range of from about 15° C. to about 100° C., preferably about 20° C. to about 100° C., and most preferably 20° C. to 60° C. under any pressure, preferably atmospheric pressure, for any length of time so long as the metal compound and the zeolite are well mixed, generally about 1 minute to about 15 hours, preferably about 1 minute to about 5 hours.

Upon completion of incorporating a Group VIII compound into the inorganic support, a mixture is formed. The mixture can be dried at about 15 to about 200° C. for about 0.1 to about 30 hours, preferably under atmospheric pressure. In the next step of the process, the mixture is subject to a heat treatment to produce a heated mixture. The heat treatment can be air calcining or steam. Air calcining can be carried out under a condition sufficient to convert a metal compound to its oxide form and can include a temperature in the range of from about 300° C. to about 1000° C., preferably about 350° C. to about 750° C., and most preferably 400° C. to 650° C. under a pressure in the range of from about 1 to about 10 atmospheres, preferably about 1 atmospheres (atm) for a period in the range of from about 1 to about 30, preferably about 1 to about 20, and most preferably 1 to 15 hours.

Steam treatment can be carried out under a suitable condition sufficient to effect the conversion of the Group VIII compound to its corresponding oxide form. Generally the steam treatment can be carried out in any suitable vessel and at a temperature in the range of from about 120° C. to about 1500° C., preferably about 200° C. to about 1200° C., and most preferably 250° C. to 1000° C. The treatment period can be as short as 5 minutes to as long as about 30 hours so long as it is sufficient to convert the Group VIII metal compound to its oxide form. The treatment can be carried out under a pressure which can maintain the required temperature and can be in the range of from about atmospheric pressure to about 100, preferably to about 50, and most preferably to 25 atm.

Upon completion of heat treatment, a heated mixture is produced which can then be contacted with a boron compound, preferably an alkali metal borohydride, under a condition that is sufficient to reduce the oxidation state of the Group VIII metal to 0. Examples of suitable boron compounds include, but are not limited to, sodium borohydride, potassium borohydride, cesium borohydride, borane, an alkyl boron, and combinations of two or more thereof. The presently preferred boron compound is an alkali metal borohydride such as sodium borohydride because it is readily available.

Any Group VIII compound can be used in the present invention. The presently preferred Group VIII compound is a platinum compound. Generally, any platinum compound that can promote the combining of platinum element with an inorganic support can be employed herein. Examples of suitable platinum compounds include, but are not limited to, chloroplatinic acid ($H_2PtCl_6 \cdot xH_2O$), platinum chloride (platinic chloride), platinum bromide, platinum iodine, tetramine platinum chloride ($Pt(NH_3)_4Cl_2 \cdot H_2O$ or $Pt(NH_3)_4Cl_2$), tetramine platinum nitrate ($Pt(NH_3)_4(NO_3)_2$), tetramine platinum hydroxide ($Pt(NH_3)_4(OH)_2$), tetrachlorodiamine platinum, and combinations of any two or more thereof. The oxidation state of platinum in the above-illustrated platinum compounds can be any available oxidation state. The presently preferred platinum compound is chloroplatinic acid for it is readily available.

Examples of other suitable Group VIII compounds include, but are not limited to, cobalt acetate, cobalt acetylacetonate, cobalt benzoylacetonate, cobalt bromide, cobalt carbonate, cobalt chloride, cobalt 2-ethylhexanoate, cobalt fluoride, cobalt iodide, cobalt 2,3-naphthalocyanine, cobalt nitrate, cobalt oxalate, cobalt perchlorate, cobalt phthalocyanine, cobalt sulfate, cobalt thiocyanate, cobalt tungstate, nickel acetate, nickel acetylacetonate, nickel bromide, nickel carbonate, nickel chloride, nickel nitrate, nickel perchlorate, nickel phosphide, nickel sulfate, nickel sulfide, nickel titanate, palladium acetate, palladium acetylacetonate, palladium bromide, palladium iodide, palladium nitrate, palladium sulfate, palladium sulfide, rhodium acetate, rhodium acetylacetonate, rhodium bromide, rhodium chloride, rhodium nitrate, rhodium octanoate, rhodium phosphate, rhodium sulfate, ruthenium nitrate, ruthenium sulfate, and combinations of any two or more thereof.

The contacting of the heated mixture with a boron compound can be carried out at a temperature, preferably about 15° C. to about 100° C. for about 0.1 to about 10 hours, preferably under atmospheric pressure to produce a boron-treated composition. The boron-treated mixture can then be subject to a heat treatment in the presence of an inert gas selected from the group consisting of nitrogen, helium, neon, argon, krypton, or combinations of two or more thereof. The heat treatment can be at a temperature in the range of from about 250° C. to about 800° C. for about 0.1 to about 10, hours preferably about 300° C. to about 700° C. for about 0.5 to about 7 hours, and most preferably 350° C. to 700° C. for 1 to 5 hours.

The boron-treated composition can then be contacted with a compound comprising both aluminum and a halogen to produce a halogen-containing composition. The compound has the formula of $AlR_{3-n}X_n$ wherein R is a hydrocarbyl radical having 1 to about 10 carbon atoms per radical and is selected from the group consisting of alkyl, aryl, alkaryl, aralkyl, alkenyl, and combinations of two or more thereof; n is 1, 2, or 3; and X is halogen. Examples of suitable $AlR_{3-n}X_n$ include, but are not limited to, aluminum trichloride, ethylaluminum sesquichloride, ethylaluminum dichloride, diethylaluminum chloride, methylaluminum dichloride, isobutylaluminum dichloride, diphenylaluminum chloride, and combinations thereof. The contacting of the boron-treated composition with $AlR_{3-n}X_n$ can be carried out under the same conditions disclosed above for the heat treatment of the boron-treated mixture with an inert gas.

Thereafter, the halogen-containing composition can be heat-treated in the presence of an inert gas, which is the same as that disclosed above, under the same condition disclosed above for heat-treating the borohydride-treated composition. In this step, a catalyst useful for use in a hydrocarbon conversion process is produced.

According to the third embodiment of the present invention, a process useful for converting a linear hydrocarbon to a branched hydrocarbon comprises, consists essentially of, or consists of contacting a fluid stream comprising the linear hydrocarbon or a mixture of linear hydrocarbons and, optionally, in the presence of a second inert fluid with a catalyst composition under a condition sufficient to effect the isomerization of a linear hydrocarbon to branched hydrocarbon or to a mixture of branched hydrocarbons. The second inert fluid can be hydrogen, nitrogen, helium, argon, carbon dioxide, neon, steam, carbon tetrachloride, and combinations of any two or more thereof. The presently preferred inert fluid is carbon tetrachloride. The inert fluid can also be fed separately into a suitable vessel for the contact with a linear hydrocarbon and a catalyst. The catalyst composition can be the same as that disclosed in the first embodiment of the invention. The term "fluid" is used herein to denote gas, liquid, vapor, or combinations of two or more thereof.

The contacting of a fluid feed stream containing a linear hydrocarbon with the catalyst composition can be carried out in any technically suitable manner, in a batch or semi-continuous or continuous process, under a condition effective to convert a linear hydrocarbon to a branched hydrocarbon. Generally, a fluid stream as disclosed above, preferably being in the vaporized state, is introduced into a suitable reactor having a fixed catalyst bed, or a moving catalyst bed, or a fluidized catalyst bed, or combinations of two or more thereof by any means known to one skilled in the art such as, for example, pressure, meter pump, and other similar means. Because a hydrocarbon conversion reactor is well known to one skilled in the art, the description of which is omitted herein for the interest of brevity. The condition can include a weight hourly space velocity (WHSV) of the fluid stream in the range of about 0.01 to about 100, preferably about 0.05 to about 50, and most preferably 0.1 to 30 g feed/g catalyst/hour. The inert fluid hourly space velocity can be in the range of from about 0.01 to about 5000 $ft^3/ft^3$ catalyst/hour. Generally, the pressure can be in the range of from about 0 to about 1000 psig and the temperature is about 50 to about 1000° C.

The process effluent or product stream generally contains the desired branched hydrocarbons which can be separated by any known methods such as, for example, distillation or fractionation distillation. Because the separation methods are well known to one skilled in the art, the description thereof is omitted herein.

After the catalyst composition has been deactivated by, for example, coke deposition or feed poisons, to an extent that the feed conversion and/or the selectivity to the desired branched hydrocarbon have become unsatisfactory, the catalyst composition can be reactivated by any means known to one skilled in the art.

The following examples are presented to further illustrate this invention using butane as hydrocarbon feed and are not to be construed as unduly limiting the scope of the present invention. The examples illustrate the preparation of catalyst compositions and the use of the composition in a hydrocarbon conversion process.

EXAMPLE I

This example illustrates the preparation of isomerization catalysts.

Catalyst A was a platinum-promoted catalyst. First, 20 g of γ-alumina (obtained from Criterion Catalyst Corp., Houston, Tex.; 1/16 inch extrudates) was impregnated with 10.03 g of 2 weight % chloroplatinic acid (in 2 weight % HCl) to produce a Pt-impregnated alumina. Following drying at about 25° C. (room temperature) for 8 hours, the Pt-impregnated alumina was calcined at 538° C. for 6 hours to produce 20.06 g of catalyst A containing 0.38 weight % platinum.

Catalyst B (comparison) was produced by first reducing 10 g of catalyst A at 400° C. for 2 hours with hydrogen gas (100 ml/minute) to produce 9.83 g of catalyst B which was then mixed with 2.0 g of aluminum trichloride. The obtained mixture was heated in a helium gas stream (100 ml/minute) for 2 hours at 650° C. to product 10.33 g of catalyst BB.

In a separate run, 10 g of catalyst A was treated with 10 weight % $NaBH_4$ in water at about 25° C. (room temperature) for 2 hours. After washing with water for 30 minutes, the resulting borohydride-treated catalyst A was dried in air for 4 hours at room temperature to produce a dried, borohydride-treated catalyst A which was then heated at 400° C. for 2 hours in a helium stream (100 ml/minute He) to produce 9.80 g of catalyst C. Catalyst C was then mixed with 2.0 g of aluminum chloride followed by heating at 650° C. for 2 hours in He stream (100 ml/minute) to produce 10.26 g of the invention catalyst (catalyst CC).

Catalysts B and C were analyzed for their element contents using X-ray fluorescence spectrometry with a Siemens MRS 400 multi-channel spectrometer. The results are shown in Table I below.

TABLE I[a]

|  | Na | Al | Pt | Cl |
|---|---|---|---|---|
| Catalyst B | 0.11 | 42.3 | 0.35 | 0.8 |
| Catalyst C | 0.16 | 41.7 | 0.35 | —[b] |

[a]The values shown are weight %.
[b]Below detection limit which is 500 parts per million by weight.

Table I demonstrates that catalyst C produced by the invention process had substantially lower residual chlorine content than catalyst B which was produced by conventional $H_2$-reduction. Because catalyst C had less residual chlorine content than catalyst B, catalyst C had more surface OH groups for contacting with aluminum chloride thereby making catalyst CC (invention) a better catalyst BB (comparison) in the hydrocarbon conversion process as shown in Example II below.

EXAMPLE II

This example illustrates the use of the catalysts BB and CC of Example I in the isomerization of butane.

A stainless steel tube (inner diameter: 1 cm; length: 60 cm) was filled with a mixture of 5 ml Alundum® (inert, low surface area alumina) and with either 5 ml of Catalyst BB or 5 ml Catalyst CC. The reactor was heated to a reaction temperature of about 115° C. Butane gas was introduced at a rate of 6 liters/hour. Hydrogen and carbon tetrachloride were introduced as cofeed at a rate of 12 liters and 0.89 microliter per hour, respectively. The reaction was carried out under 500 psig.

The reactor effluent was cooled (by means of an ice trap) to condense water vapor. The gaseous portion of the reactor effluent was passed through a wet test meter for gas volume measurement, and was analyzed by a gas chromatograph at hourly intervals. Pertinent test results are summarized in Table II.

TABLE II[a]

| Catalyst | TOS | n-Butane Conversion % | Isobutane Selectivity (%) |
|---|---|---|---|
| BB | 7.50 | 11.43 | 99.003 |
| CC | 7.25 | 15.94 | 99.310 |

[a]TOS, time (hours) on stream or reaction time.

Test data in Table II show that in the isomerization of butane, catalyst CC (produced by the invention process) was more effective (in terms of butane feed conversion and of selectivity to isobutane) than catalyst BB. This result is most surprising.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising: (1) combining at least one Group VIII metal compound and an inorganic support to produce a mixture, (2) calcining said mixture under a condition sufficient to convert said metal compound to its oxide form to produce a heated mixture, (3) contacting said heated mixture with a boron compound under a condition sufficient to reduce the oxidation state of said metal whereby a boron-treated composition is produced; and (4) contacting said boron-treated composition with a compound comprising aluminum and halogen.

2. A process according to claim 1 wherein said Group VIII compound is a platinum compound.

3. A process according to claim 1 wherein said Group VIII compound is selected from the group consisting of chloroplatinic acid, platinum chloride (platinic chloride), platinum bromide, platinum iodine, tetramine platinum chloride, tetramine platinum nitrate, tetramine platinum hydroxide, tetrachlorodiamine platinum, and combinations of two or more thereof.

4. A process according to claim 1 wherein said Group VIII compound is chloroplatinic acid.

5. A process according to claim 1 wherein said boron compound is a borohydride.

6. A process according to claim 1 wherein said boron compound is an alkali metal borohydride.

7. A process according to claim 1 wherein said boron compound is sodium borohydride.

8. A process according to claim 4 wherein said boron compound is sodium borohydride.

9. A process according to claim 1 wherein said compound comprising aluminum and halogen has the formula of $AlR_{3-n}X_n$ wherein R is hydrocarbyl radical; n is 1, 2, or 3; and X is a halogen.

10. A process according to claim 1 wherein said compound comprising aluminum and halogen is selected from the group consisting of aluminum trichloride, ethylaluminum sesquichloride, ethylaluminum dichloride, diethylaluminum chloride, methylaluminum dichloride, isobutylaluminum dichloride, diphenylaluminum chloride, and combinations thereof.

11. A process according to claim 1 wherein said compound comprising aluminum and halogen is aluminum chloride.

12. A process according to claim 3 wherein said boron compound is a borohydride.

13. A process according to claim 12 wherein said compound comprising aluminum and halogen is selected from the group consisting of aluminum trichloride, ethylaluminum sesquichloride, ethylaluminum dichloride, diethylaluminum chloride, methylaluminum dichloride, isobutylaluminum dichloride, diphenylaluminum chloride, and combinations thereof.

14. A process according to claim 8 wherein said compound comprising aluminum and halogen is aluminum chloride.

15. A process comprising: (1) combining at least one Group VIII metal compound and an inorganic support to produce a mixture, (2) calcining said mixture under a condition sufficient to convert said metal compound to its oxide form to produce a heated mixture, (3) contacting said heated mixture with a boron compound under a condition sufficient to reduce the oxidation state of said metal whereby a boron-treated composition is produced; and (4) contacting said boron-treated composition with a compound comprising aluminum and halogen wherein said Group VIII metal compound is a platinum compound;

said boron compound is a borohydride; and said compound comprising aluminum and halogen has the formula of $AlR_{3-n}X_n$ wherein R is hydrocarbyl radical; n is 1, 2, or 3; and X is a halogen.

16. A process according to claim 15 wherein said Group VIII compound is selected from the group consisting of chloroplatinic acid, platinum chloride (platinic chloride), platinum bromide, platinum iodine, tetramine platinum chloride, tetramine platinum nitrate, tetramine platinum hydroxide, tetrachlorodiamine platinum, and combinations of two or more thereof;

said boron compound is an alkali metal borohydride; and said compound comprising aluminum and halogen is selected from the group consisting of aluminum trichloride, ethylaluminum sesquichloride, ethylaluminum dichloride, diethylaluminum chloride, methylaluminum dichloride, isobutylaluminum dichloride, diphenylaluminum chloride, and combinations thereof.

17. A process according to claim 15 wherein said Group VIII metal compound is chloroplatinic acid, said boron compound is sodium borohydride, and said compound comprising aluminum and halogen is aluminum chloride.

18. A process comprising: (1) combining at least one platinum compound and alumina to produce a mixture, (2) calcining said mixture under a condition sufficient to convert said platinum compound to a platinum oxide to produce a heated mixture, (3) contacting said heated mixture with sodium borohydride under a condition sufficient to reduce the oxidation state of platinum whereby a borohydride-treated composition is produced; and (4) contacting said borohydride-treated composition with aluminum chloride.

19. A process according to claim 18 wherein said platinum compound is chloroplatinic acid.

* * * * *